(12) United States Patent
Ciminelli et al.

(10) Patent No.: US 9,863,771 B2
(45) Date of Patent: Jan. 9, 2018

(54) OPTICAL ROTATION SENSOR AS WELL AS METHOD OF MANUFACTURING AN OPTICAL ROTATION SENSOR

(71) Applicant: ESA EUROPEAN SPACE AGENCY, Paris (FR)

(72) Inventors: Caterina Ciminelli, Bari (IT); Edoardo C. Campanella, Gioia del Colle (IT); Mario N. Armenise, Bari (IT)

(73) Assignee: ESA European Space Agency, Paris (FR)

( * ) Notice: Subject to any disclaimer, the term of this patent is extended or adjusted under 35 U.S.C. 154(b) by 0 days.

(21) Appl. No.: 14/784,278

(22) PCT Filed: Apr. 2, 2013

(86) PCT No.: PCT/EP2013/056933
§ 371 (c)(1),
(2) Date: Oct. 13, 2015

(87) PCT Pub. No.: WO2014/161565
PCT Pub. Date: Oct. 9, 2014

(65) Prior Publication Data
US 2016/0069687 A1 Mar. 10, 2016

(51) Int. Cl.
*G01C 19/72* (2006.01)
*G01C 25/00* (2006.01)

(52) U.S. Cl.
CPC ......... *G01C 19/727* (2013.01); *G01C 19/721* (2013.01); *G01C 25/00* (2013.01); *G02F 2203/15* (2013.01)

(58) Field of Classification Search
CPC .... G01C 19/72; G01C 19/64; G02B 6/29338; G02B 6/29347
See application file for complete search history.

(56) References Cited

U.S. PATENT DOCUMENTS 5,064,288 A * 11/1991 Dyes ............... G01C 19/72
356/461
6,831,938 B1 * 12/2004 Gunn, III ........... G02B 6/12004
372/67

(Continued)

OTHER PUBLICATIONS

C. Ciminelli; F. Dell'Olio; C.E. Campanella; M.N. Armenise: 'Photonic technologies for angular velocity sensing' Advances in Optics and Photonics vol. 2, 2010, pp. 370-404.
M.N. Armenise; V.M.N. Passaro; F. De Leonardis; M. Armenise: 'Modelling and Design of a Novel Miniaturized Integral Optical Sensor for Gyroscope Applications' J. Lightwave Technol. vol. 19, 2001, pp. 1476-1494.
C. Ciminelli; C.E. Campanella; M.N. Armenise: 'Optimized design of Integrated Optical Angular Velocity Sensors based on a Passive Ring Resonator' J. Lightwave Techno!. vol. 27, 2009, pp. 2658-2666.

(Continued)

*Primary Examiner* — Maurice Smith
(74) *Attorney, Agent, or Firm* — Waller Lansden Dortch & Davis LLP; Mark A. Pitchford

(57) ABSTRACT

An optical rotation sensor is provided, comprising an optical ring resonator (RR) formed by a one-dimensional photonic crystal (1D PhC) waveguide, and a bus waveguide. A light input section of the bus waveguide is connectable to a light source, and a light output section of the bus waveguide is connectable to a light detector. The bus waveguide is optically coupled to the ring resonator within a coupling area which is located between the light input section and the light output section of the bus waveguide. The optical rotation sensor is configured to measure a shift of frequency of a resonance area (or a plurality of resonance areas) close to a band edge of a photonic band gap of the ring resonator, wherein the shift of frequency is caused by a rotation of the optical rotation sensor.

15 Claims, 9 Drawing Sheets

(56) References Cited

U.S. PATENT DOCUMENTS

| | | | | |
|---|---|---|---|---|
| 2004/0008968 | A1* | 1/2004 | Lee | C03C 4/04 385/142 |
| 2004/0067450 | A1* | 4/2004 | Leatherdale | G02B 6/1221 430/322 |
| 2004/0233458 | A1* | 11/2004 | Frick | G01D 5/268 356/480 |
| 2004/0263856 | A1* | 12/2004 | Willig | G01C 19/721 356/460 |
| 2005/0013529 | A1* | 1/2005 | Chiu | G02B 6/29341 385/15 |
| 2005/0147348 | A1* | 7/2005 | Grunnet-Jepsen | G02B 6/29322 385/37 |
| 2008/0074673 | A1* | 3/2008 | Tazartes | G01C 19/64 356/470 |
| 2009/0027754 | A1* | 1/2009 | Steinberg | B82Y 20/00 359/238 |
| 2010/0260462 | A1* | 10/2010 | Zhang | B82Y 20/00 385/131 |
| 2011/0194812 | A1* | 8/2011 | Melin | G02B 6/02333 385/27 |
| 2012/0063484 | A1* | 3/2012 | Goddard | G02B 6/12007 372/94 |
| 2012/0293800 | A1* | 11/2012 | Gerken | G01N 21/7743 356/364 |

OTHER PUBLICATIONS

Damian Goldring et al: "Highly dispersive micro-ring resonator based on one dimensional photonic crystal waveguide design and analysis", Opt. Express, Jan. 24, 2007 (Jan. 24, 2007), pp. 3156-3168, XP055092518, Retrieved from the Internet: URL:http://www.opticsinfobase.org/DirectPDFAccess/990F85AF-D9E0-01F8-B1A2ADD2634BD101_131174/oe-15-6-3156.pdf?da=1&id=131174&seq=0&mobile=no [retrieved on Dec. 10, 2013].

Jacob Scheuer et al: "Sagnac Effect in Coupled-Resonator Slow-Light Waveguide Structures", Physical Review Letters, vol. 96, No. 5, Feb. 10, 2006 (Feb. 10, 2006), XP055092557, ISSN: 0031-9007, DOI: 10.1103/PhysRevLett.96.053901.

Ben Z. Steinberg et al: "Rotation-induced superstructure in slow-light waveguides with mode-degeneracy: optical gyroscopes with exponential sensitivity", Journal of the Optical Society of America B, vol. 24, No. 5, Jan. 1, 2007 (Jan. 1, 2007), pp. 1216-1224, XP055092616, ISSN: 0740-3224, DOI: 10.1364/JOSAB.24.001216.

International Search Report from PCT Application No. PCT/EP2013/056933 dated Dec. 20, 2013.

Written Opinion from PCT Application No. PCT/EP2013/056933 dated Dec. 20, 2013.

\* cited by examiner

| Parameters | | |
|---|---|---|
| 1D PhC order | 1 | 1 |
| Operating wavelength | $\lambda_0$ | 1.55 μm |
| Unperturbed waveguide refractive index | $n_{eff}$ | 1.457 |
| Unperturbed waveguide propagation loss | $\alpha$ | 0.07 dB/cm |
| Index variation of PhC | $\Delta n$ | $1 \times 10^{-3}$ |
| Lattice constant | $\Lambda$ | 531.9 nm |
| PBG width | $\Delta\lambda_{PBG}$ | 1 nm |
| PBG central wavelength | $\lambda_{0\,PBG}$ | 1.55 μm |
| Power coupled from bus to ring | $1-\tau^2(\tau \approx 0.99)$ | 2% |
| 1D PhC ring length | $L = 2\pi R$ | 14.4 cm |

Fig. 7

| Gyro system parameters | | |
|---|---|---|
| Quantum efficiency of photodetector | $\eta_{pd}$ | 0.8 |
| Operating wavelength | $\lambda_0$ | 1.55 μm |
| Power at the photodetector | $P_{pd}$ | 6 mW |
| Measure system bandwidth | B | 1 Hz |
| Power coupled from bus to ring | $1-\tau^2$ | 2% |
| 1D PhC ring length | L | 14.4 cm |

Fig. 10

| | Loss [dB/cm] | 0.07 | 0.1 | 0.13 | 0.16 |
|---|---|---|---|---|---|
| $\delta\Omega$ [°/h] | SOS 1D PhC ring resonator | $2 \times 10^{-3}$ | $2.7 \times 10^{-3}$ | $3 \times 10^{-3}$ | $3.8 \times 10^{-3}$ |
| $\delta\Omega$ [°/h] | SOS ring resonator | 1.5 | 2.14 | 2.4 | 3.2 |

Fig. 11

OPTICAL ROTATION SENSOR AS WELL AS METHOD OF MANUFACTURING AN OPTICAL ROTATION SENSOR

TECHNICAL FIELD

The present invention relates to an optical rotation sensor as well as a method of manufacturing an optical rotation sensor.

BACKGROUND

In recent years, several configurations of optical rotation sensors have been proposed for a large variety of applications, ranging from micro-satellite systems to terrestrial vehicles.

Classical optical rotation sensors which are based on the Sagnac effect include both active configurations, such as ring laser gyroscopes (also named "gyros") in free space optics, and passive configurations in fiber optics technology, such as Resonant Fiber Optics Gyroscopes (RFOGs) and Interferometric Fiber Optic Gyroscopes (IFOGs). IFOGs and RFOGs sensors are based on an open optical path and an optical ring resonator, respectively. The Sagnac effect causes a phase shift or frequency shift between two counter-propagating light beams being proportional to the angular velocity of the optical rotation sensor. Due to the Sagnac effect, a phase change can be detected using a phase sensitive read-out mechanism (used in IFOGs), whereas a frequency change can be detected using a frequency sensitive read-out mechanism (used in RFOGs).

The phase sensitive read-out mechanism is based on the detection of a power variation caused by the interference between the two counter-propagating light beams which experience a rotation induced phase mismatch (Sagnac phase shift). Differently, the frequency sensitive read-out mechanism is based on the detection of a difference in the resonance frequencies between two counter-propagating light beams which resonate at different wavelengths due to the rotation (Sagnac resonance wavelength difference).

In the IFOGs, a key element (which is sensitive to the angular velocity) comprises one or more optical fiber multi-turn coils. The Sagnac phase shift induced by the Sagnac effect is directly proportional to the angular velocity, the fiber coil diameter, and the number of coils. The resolution of these devices, i.e. the minimum detectable angular velocity, is inversely proportional to the total length of the optical fiber, i.e. inversely proportional to the fiber coil diameter. This means that the overall area occupied by the optical fiber coils is very large. As an example, inertial state-of-the-art IFOG systems show a resolution of 0.001°/h. Such systems are e.g. used in satellites for Earth and planet observation. However, in order to provide a resolution of 0.001°/h, four optical fiber coils having each a diameter of 20 cm and a fiber length of 5 km have to be used. In contrast, in the RFOGs, the key sensitive element comprises a resonant optical fiber cavity. The Sagnac resonance wavelength difference induced by the Sagnac effect is directly proportional to the angular velocity and strongly depends on the architecture of the resonant cavity. The resolution of the RFOGs is enhanced by increasing the length of the resonant cavity. Thus, like in IFOGs, in RFOGs the overall area occupied by the resonant cavity is large.

The following references describe known optical rotation sensor technology:

C. Ciminelli, F. Dell'Olio, C. E. Campanella, M. N. Armenise, "Photonic-technologies for angular velocity sensing", Advances in Optics and Photonics 2, 370-404 (2010)

M. N. Armenise, V. M. N. Passaro, F. De Leonardis, M. Armenise: Modelling and Design of a Novel Miniaturized Integral Optical Sensor for Gyroscope Applications, J. Lightwave Technol., vol 19, pp. 1476-1494, 2001

C. Ciminelli, C. E. Campanella, M. N. Armenise: Optimized design of Integrated Optical Angular Velocity Sensors based on a Passive Ring Resonator, J. Lightwave Technol., vol 27, pp. 2658-2666, 2009.

SUMMARY

It is an object of the present invention to provide an optical rotation sensor which is compact, but which is nevertheless capable to measure an angular velocity with high precision.

In order to solve the above object, the present invention provides an optical rotation sensor according to claim 1. Further, the present invention provides an angular velocity sensor according to claim 11 and a switch according to claim 12. Also, a method of manufacturing an optical rotation sensor according to claim 13 is provided.

According to a first aspect of the present invention, an optical rotation sensor is provided, comprising an optical ring resonator (RR) including a one-dimensional photonic crystal (1D PhC) waveguide (a waveguiding ring resonator including a one-dimensional photonic crystal, 1D PhC) and a bus waveguide. A light input section of the bus waveguide is connectable to a light source, and a light output section of the bus waveguide is connectable to a light detector. The bus waveguide is optically coupled to the ring resonator within a coupling area which is located between the light input section and the light output section of the bus waveguide. The optical rotation sensor is configured to measure a shift of frequency of a resonance area (or a plurality of resonance areas) close to a band edge of a photonic band gap of the ring resonator, wherein the shift of frequency is caused by a rotation of the optical rotation sensor.

In order to measure a rotation of the optical rotation sensor, frequency shifts of an arbitrary number of resonance areas may be determined. However, the detection of a frequency shift of only one resonance area is also sufficient. For example, only a frequency shift of a resonance area closest to the band edge of the photonic band gap of the ring resonator may be used in order to measure the angular velocity. Using the resonance area closest to the band edge of the photonic band gap of the ring resonator has the advantage that this resonance area is the narrowest (i.e. has the sharpest shape), i.e. the shift of the resonance frequency is best distinguishable and, thus, the precision in the measurement of the rotation of the optical rotation sensor is the highest.

In the scope of the present invention, the term "resonance area" may in particular mean an area (frequency range of light inputted into the input section from the light source) within which there is a minimum or a maximum of transmittance of light guided from the input section of the bus waveguide through the coupling area to the output section of the bus waveguide. That is, the term "resonance area" characterizes an area (frequency range) within which the coupling area transmittance is high (maximum) or low (minimum). In the case where only one single bus waveguide is used in order to excite the 1D PhC ring resonator, the term "resonance area" may be referred to a frequency range within which the coupling area transmittance is low (minimum). In the case where two bus waveguides are used in order to excite the 1D PhC ring resonator, two cases have to be distinguished: a) light guided from the coupling area to the light detector is guided through the same waveguide which guides the light from the light source to the coupling area ("through mode")—in this case the term "resonance area" may be referred to a frequency range within which the coupling area transmittance is low (minimum); b) light guided from the coupling area to the light detector is guided through a waveguide which is different from a waveguide which guides the light from the light source to the coupling area ("drop mode")—in this case the term "resonance area" may be referred to a frequency range within which the coupling area transmittance is high (maximum).

In this context, the feature that a resonance area is located "close" to a band edge means that a positional difference between a position of the resonance (minimum/maximum in the spectral response domain) and a position of an edge of the photonic band gap (in the spectral response domain) is small, preferably as small as possible. The positional difference varies in dependence on constructional details of the optical rotation sensor like material, physical dimensions of ring resonator and bus waveguide, etc.

The bus waveguide excites the optical ring resonator by guiding light from the light input section to the coupling area. Additional waveguides may be provided for exciting the optical ring resonator. For example, the optical rotation sensor may comprise two waveguides, wherein one of the waveguides induces a light beam rotating in the clockwise direction in the ring resonator, and the other one of the waveguides induces a light beam rotating in the anti-clockwise direction in the ring resonator. Using two waveguides makes it easier to measure a rotation of the optical rotation sensor, compared to the case where only one waveguide is used.

The ring resonator may show a circular loop. However, the embodiments of the present invention are not restricted to a circular loop: the ring resonator may have any suitable shape as long as it is a closed loop shape. For example, the ring resonator may have a closed spiral loop shape.

Involving a 1D photonic crystal ring resonator as sensing element allows to realize a Passive Ring Resonator Gyroscope (PRRG) with a detection limit of about $10\text{-}3°/h$, i.e. about several order of magnitude lower than a conventional ring resonator based gyroscope while keeping the size of the optical cavity of the same order like in the conventional ring resonator based gyroscope. In this regard, the inventors found out that measuring a shift of frequency of resonance areas at or close to a band edge of the photonic band gap of the ring resonator enables to carry out very precise rotation measurements. This is due to the fact that these resonance areas show a very high Q-factor which makes it possible to detect the frequency shifts.

The high measurement precision results from the fact that the resonance areas (i.e. the frequency ranges at which there is a transmission rate maximum of light through the coupling area or a transmission rate minimum of light through the coupling area) are so sharp (focused on a small frequency range) in the detector output signal that their shift can also be clearly observed even in a weak detector output signal. That is, the shift of the resonance frequency is the more distinguishable the more sharp the resonance minimum/maximum (minimum/maximum of light transmission through the coupling area) associated with the spectral response in transmission is. In the detector output signal the shift can be well observed even in a weak detector output signal. As a consequence, light detectors having the same characteristics as those of conventional optical rotation sensors may be used without deteriorating measurement quality.

The 1D PhC ring resonator may differ from the conventional ring resonator in several aspects: In a waveguide ring resonator, the phase accumulation due to the light propagation is essentially that of a plane wave and the path closing condition allows the formation of resonances when the phase matching condition is fulfilled, depending on the optical path. In a 1D PhC ring resonator, the propagation mechanism is governed by the photonic crystal dispersion relation and it depends on the bandwidth of the propagating light. In contrast with the relatively weak dispersion and the large bandwidth of the plane waves or the optical fiber modes, 1D PhC modes are strongly affected by a coupling between a forward mode and a backward mode in a spectral region of a photonic band gap (PBG) where the propagation is inhibited. Therefore, the 1D PhC ring resonator spectral response is strongly influenced by the dispersion conditions and the PBG due to the presence of the 1D PhC.

In order to guarantee a high Q-factor of the resonance areas at or close to the band edge of the photonic band gap of the ring resonator, the optical rotation sensor may be designed to show at least one of a plurality of constructional features which will be described in the following (or a combination of these constructional features).

The ring resonator may comprise a concatenation of a plurality of first regions of a first refractive index and a plurality of second regions of a second reflective index which alternate with each other, wherein the first refractive index differs from the second refractive index. Such a concatenation of first regions and second regions creates the photonic band gap within the ring resonator and thus defines the locations of the frequencies of the resonance areas.

More generally, photonic band gaps are created in the ring resonator by forming periodic structures in the ring resonator, as an example in a grating formed by alternating regions having different refractive index, where, under the Bragg conditions, the coupling between the forward mode and the backward mode is allowed. That is, instead of the alternating of first regions and second regions having different refractive indices, any other periodic structure (internal periodicity of material properties) suitable for generating a photonic band gap may be implemented in the ring resonator.

The difference ("index contrast") between the first refractive index and the second refractive index may for example range extending from $10^{-3}$ to $10^{-5}$.

By increasing the refractive index contrast between the alternating regions within the mentioned range, an enhancement of the Q factor and, consequently, an improvement of the resolution of the optical rotation sensor can be obtained even when increasing the number of alternating regions (first regions and second regions) and decreasing the power coupled to 1D PhC ring resonator through the bus waveguide at the same time.

The length of a period $\Lambda$ (sum of lengths of a first area and a second area) in the ring resonator may for example be lower than 531 nm in order to achieve good measurement results. Assuming L as the ring length and M as the number of the first regions (equal to that of second regions), then $L=M\Lambda$, being $\Lambda$ equal to the sum of one first region and one second region and $M>1700$. A period length $\Lambda$ of 531 nm may then lead to $M=270728$ if $L=14.4$ cm. Generally, the sum of the lengths of the first region and the second region depends on the fulfillment of the Bragg conditions at a specified wavelength with which the sensor is operated. In this case, this means that, assuming that the sensor operating wavelength is 1.55 µm, then the sum of one first region and one second region is about 531 nm.

A ratio between power of electric field of the light guided from the input section of the bus waveguide to the coupling area and power of the electric field coupled from the bus waveguide into the ring resonator within the coupling area may range from 0.01 to 0.1.

The above ranges may be used alone or in combination with each other. In case that the optical rotation sensor fulfills the criteria of all three ranges, a very high angular velocity measurement accuracy can be guaranteed.

The optical rotation sensor may comprise a silicon layer and a doped silica layer provided above the silicon layer, wherein the ring resonator and the bus waveguide are formed within the doped silica layer. Optionally, between the silicon layer and the doped silica layer, a first silica layer may be provided. Further, optionally, above the doped silica layer, a second silica layer may be provided. The doped silica layer may comprise Germanium as dopant material. The first silica layer and/or the second silica layer do not necessarily have to comprise dopant material. However, better measurement results are achieved if the first silica layer and/or the second silica layer also comprise dopant material. In this case, it is advantageous if the first silica layer and/or the second silica layer comprise dopant material being different in type than that of the doped silica layer (e.g. a dopant material other than Germanium if the dopant material of the doped silica layer is Germanium).

The refractive index of the bus waveguide advantageously is the same as that of the second regions.

According to a second aspect of the present invention, a method of manufacturing an optical rotation sensor is provided, comprising forming a ring resonator as a one-dimensional photonic crystal waveguide in a doped silica layer provided above a silicon layer. Further, the method comprises forming a bus waveguide in the doped silica layer such that a light input section of the bus waveguide is connectable to a light source, and a light output section of the bus waveguide is connectable to a light detector, and a bus waveguide is optically coupled to the ring resonator within a coupling area which is located between the light input section and the light output section. The formation of the ring resonator and the bus waveguide is carried out such that the optical rotation sensor is capable of measuring a shift of frequency of a resonance area at or close to a band edge of a photonic band gap of the ring resonator caused by a rotation of the optical rotation sensor.

The formation of the ring resonator and the bus waveguide may be carried out by exposing the doped silica layer to ultraviolet light radiation. The ring resonator may be formed by irradiating a plurality of first regions of the doped silica layer with a first irradiation dose, and by irradiating a plurality of second regions of the doped silica layer with a second irradiation dose, wherein a concatenation of thus irradiated first regions and second regions forms the ring resonator. By irradiating the first regions with a different irradiation dose than the second regions, the refractive index between the first regions and the second regions differs.

The bus waveguide may be formed by irradiating a corresponding part of the doped silica layer with the second irradiation dose. Thus, the refractive index of the bus waveguide is the same as that of the second regions.

The rotation sensor according to embodiments of the present invention may be used as "classical" rotations sensor to detect an angular velocity, as already described, or also for other purposes, e.g. as switch. The switch can be controlled by the angular velocity change rate: when the ring resonator, initially excited by a wavelength corresponding to a band edge resonance (or a resonance close thereto), experiences some angular velocities, the spectral response of the device may be shifted such that the excitation wavelength falls within the PBG where the propagation is forbidden. In these conditions, the light at the output section of the bus waveguide is "switched on", i.e. the transmittance of light through the coupling area has a maximum which is detected in an output signal of the light detector based on which a switching signal can be generated. That is, a switch is provided, the switching mechanism thereof being based on the change of the angular velocity; the light at the output section of the bus waveguide can be on/off switched by changing the angular velocity of the system. The switch may be adapted to switch from a first state to a second state when the shift of frequency of a resonance area at or close to a band edge of a photonic band gap of the ring resonator caused by a rotation of the optical rotation sensor exceeds a predetermined threshold value.

The ring resonator configuration proposed in this invention can be used also in high sensitive biochemical sensors by exploiting the intrinsic feature of ultra high Q-factor of the band edges resonances, or as optical filter or optical modulator.

The ring resonator may be excited by one or two (or even more) bus waveguides. Assuming that only one bus waveguide is used, and assuming that the bus waveguide is only weakly coupled to the ring resonator, no resonances can exist within the photonic band gap, while some resonances do appear at the band edges of the photonic band gap. The resonances are located at the same spectral positions of the 1D PhC transmittance oscillations (that is, if the 1D PhC was not a ring resonator, but an open loop, it would show resonances, appearing as transmittance maxima, localized at the band edges of the photonic band gap. The resonances are due to the finite size of the 1D PhC. They physically arise from the constructive interference of the optical waves at the edges of the 1D PhC structure having a finite size), and are caused by a feedback mechanism introduced by designing the 1D PhC structure to have a circular path. The higher the number of the alternating regions (first regions, second regions) in the PhC structure (i.e. the higher the number of periods (a period being a pair of a first region and a second region) is), the narrower the resonances are located relative to each other, and the easier a frequency shift of these resonances can be detected.

As already indicated above, in a gyroscope based on a 1D PhC RR, the band edge resonances shift toward longer or shorter wavelengths depending on the sense of rotation. The usage of the Sagnac effect together with the very high Q-factor of the band edge resonances allows achieving a detection limit being several orders of magnitude lower than a conventional ring resonator gyroscope having the same geometrical characteristics.

Advantageously, in order to obtain an ultra-high value of the Q-factor, the following conditions may be fulfilled simultaneously:
(a) a relative small index contrast between the alternating regions (first region; second region) in the PhC RR;
(b) a high number of periods;
(c) a weak coupling between the ring resonator and the bus waveguide(s).

Embodiments of the present invention provide at least some of the following advantages/features:

A 1D PhC RR can be provided having a theoretical Q-factor value of the order of about $10^{10}$, that is, the best value known up to now.

A 1D PhC RR can be provided which can be used in particular in an optical gyroscope of a space applications where a resolution (detection limit) of the order of $10^{-3}$°/h is required.

The gyroscope resolution is increased of about three orders of magnitude with respect to a conventional PRRG while occupying the same area.

Using a low index contrast technology (e.g. Silica on Silicon, SOS) allows achieving a higher uniformity of the fabrication process and a lower scattering loss for the waveguiding elements (i.e. bus waveguides, unperturbed waveguide regions).

The light source which couples the light into the input light section of the bus waveguide may for example be a laser. The light coupled into the input light section of the bus waveguide excites the passive ring resonator representing the sensing element.

The light detecting element may be adapted to detect a light intensity of the light guided from the coupling area to the light output section. During calibration of the optical rotation sensor, the light source may send out light of one frequency which, however, is changed over time ("frequency scan"). The frequency scan may be used to analyze the spectral response of the optical rotation sensor in order to determine the actual positions of the resonance areas. Once the position of a resonance area (e.g. that one closest to the photonic band gap) has been determined, the light source may only send out light of just one frequency corresponding to that of the determined resonance area during operation of the optical rotation sensor.

BRIEF DESCRIPTION OF THE DRAWINGS

In the following description, embodiments of the present invention will be explained while making reference to the accompanying drawings, wherein:

FIG. 7 shows an example of a set of parameters of an optical rotation sensor according to an embodiment of the present invention;

FIG. 10 shows the gyro system parameters according to an embodiment of the present invention;

FIG. 11 shows the comparison between the sensitivity of a SOS 1D PhC ring resonator and that of an SOS ring resonator according to an embodiment of the present invention.

DETAILED DESCRIPTION

Figure 1:
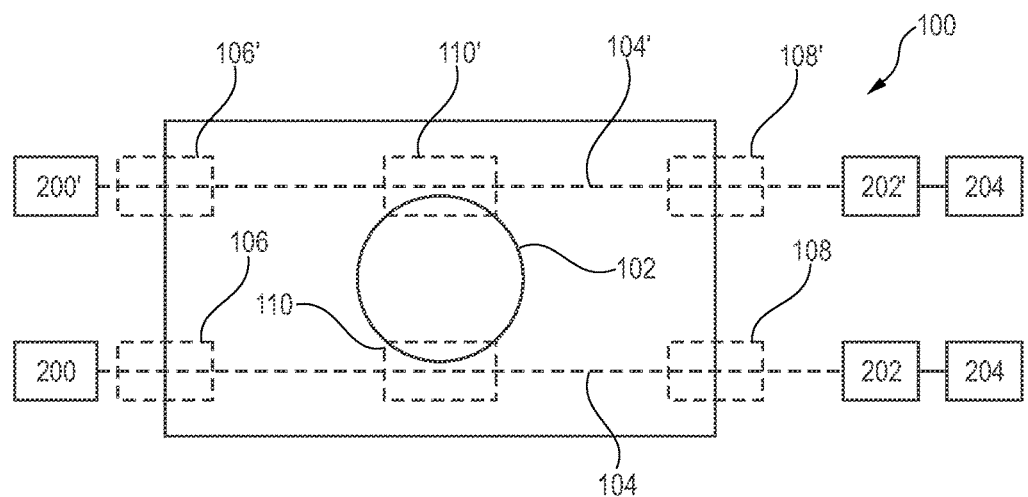
FIG. 1 shows an optical rotation sensor according to an embodiment of the present invention.

FIG. 1 shows an optical rotation sensor according to an embodiment of the present invention.

An optical rotation sensor 100 comprises a ring resonator 102 formed by a one-dimensional photonic crystal waveguide and a bus waveguide 104. The bus waveguide can be placed on the same plane of the ring resonator 102 or on a parallel plane below or over the plane of the ring resonator 102. Placing the bus waveguide 104 on a plane oriented parallel and below or over the plane of the ring resonator 102 induces more manufacturing effort; however, in this case the optical rotation sensor 100 can be manufactured with more preciseness (in particular, the strengths of coupling light from the bus waveguide 104 into the ring resonator 102 can be adjusted with more preciseness). A light input section 106 of the bus waveguide 104 is connectable to a light source 200, and a light output section 108 of the bus waveguide 104 is connectable to a light detector 202. The bus waveguide 104 is optically coupled to the ring resonator 102 within a coupling area 110 which is located between the light input section 106 and the light output section 108. Due to its technical details, the optical rotation sensor 100 is capable to measure a shift of frequency of a resonance area at or close to a band edge of a photonic band gap of the ring resonator 102 caused by a rotation of the optical rotation sensor 100 (i.e. capable to provide a light signal to the light output section 108 from which a shift of frequency due to rotation of the ring resonator 102 can be detected although the rotation of the ring resonator 102 is very small). A further bus waveguide 104' may optionally be provided in addition to the bus waveguide 104. In this case, a light input section 106' of the bus waveguide 104' is connectable to a light source 200', and a light output section 108' of the bus waveguide 104' is connectable to a light detector 202'. The bus waveguide 104' is optically coupled to the ring resonator 102 within a coupling area 110' which is located between the light input section 106' and the light output section 108'.

The optical rotation sensor 100 can be operated in the "through mode". In the through mode, light generated by a light source 200 coupled to the input section 106 is guided therefrom to the light output section 108 where it is detected by detector 202 coupled to the light output section 108, and light generated by a light source 200' coupled to the input section 106' is guided therefrom to the light output section 108' where it is detected by a second detector 202' coupled to the light output section 108'.

Alternatively, the light source 200' may be replaced by the detector 204, and the light detector 202 may be replaced by the light source 200'. Such a modified optical rotation sensor can be operated in the in the drop mode: In the drop mode, the light generated by the light source 200 coupled to the input section 106 is guided therefrom via the waveguide 104 and the waveguide 104' to the light input section 106' (which, in this case, is used as light output section) to which detector 202 is coupled. Further, light generated by light source 200' which is coupled to the output section 108 (which is used as light input section in this case) is guided therefrom via the waveguide 104 and the waveguide 104' to the light output section 108' to which detector 202' is coupled.

Each of the detector 202 and the detector 202' may be coupled to a signal processing unit 204, 204', respectively, which processes the respective output signals. The signal processing unit 204' may be integrally formed with the signal processing unit 204.

Figure 2:
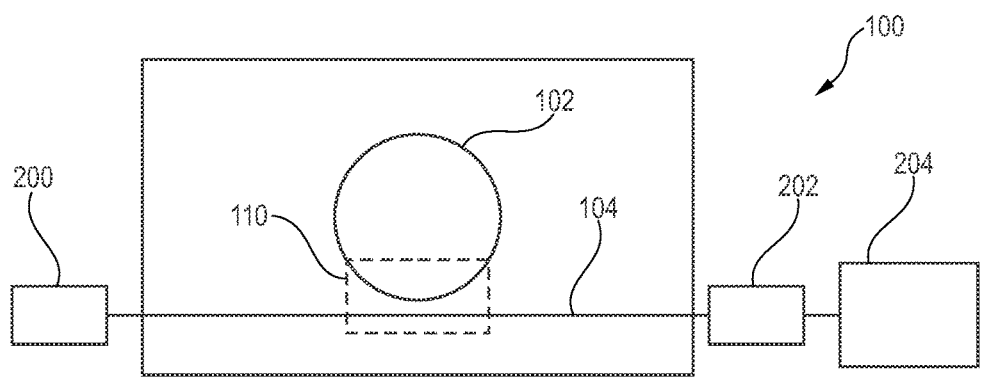
FIG. 2 shows an optical rotation sensor according to an embodiment of the present invention.

FIG. 2 shows the case where only one of the two waveguides 104, 104' as well as corresponding components attached thereto (light source and light detector) of FIG. 1 is used.

Figure 3:
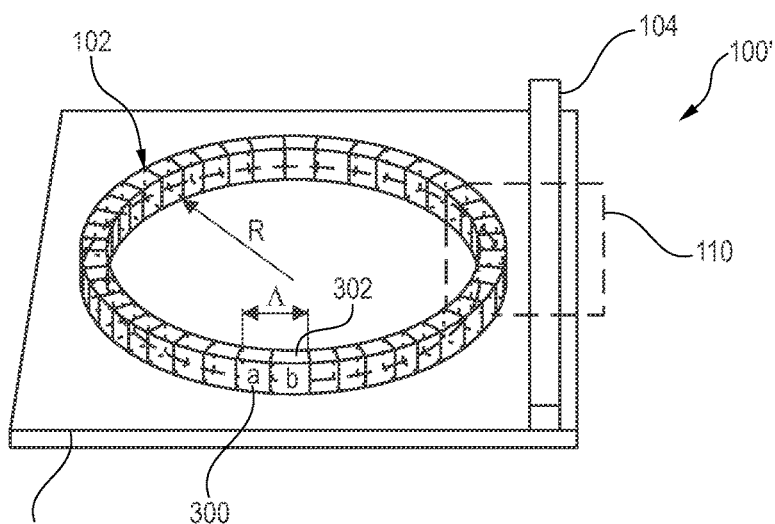
FIG. 3 shows an optical rotation sensor according to an embodiment of the present invention.

As shown in FIG. 3, an optical rotation sensor 100' may comprise a ring resonator 102 having a concatenation of a plurality of first regions 300 of a first refractive index and a plurality of second regions 302 of a second refractive index which alternate with each other, wherein the first refractive index differs from the second refractive index. The ring resonator 102 and the bus waveguide 104 are provided on a substrate 304.

The difference ("index contrast") between the first refractive index and the second refractive index may range between $10^{-3}$ and $10^{-5}$.

A ratio between power of the electric field of light emitted by the light source 200 and guided from the light input section 106 of the bus waveguide 104 to the coupling area 110 and power of the electric field coupled from the bus waveguide into the ring resonator within the coupling area may range from 1% to −10%.

Figure 4:
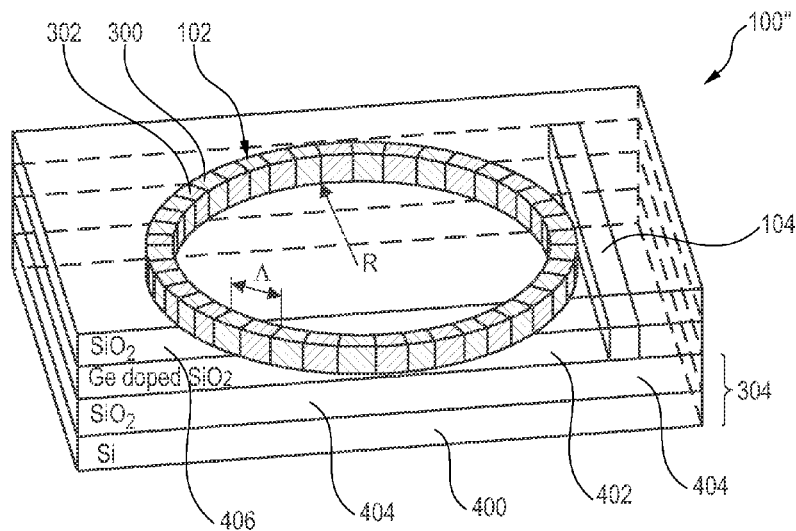
FIG. 4 shows an optical rotation sensor according to an embodiment of the present invention.

As shown in FIG. 4, the optical rotation sensor 100'' may comprise a silicon layer 400 and a doped silica layer 402 provided above the silicon layer 400, wherein the ring resonator 102 and the bus waveguide 104 are formed within the doped silica layer 402. Between the silicon layer 400 and the doped silica layer 402, a first silica layer 404 may be provided. Further, above the doped silica layer 402, a second silica layer 406 may be provided. The doped silica layer 402 may comprise Germanium as dopant material. The first silica layer 404 and/or the second silica layer 406 may also comprise dopant material, however different in type than that of the doped silica layer (e.g. a dopant material other than Germanium if the dopant material of the doped silica layer 402 is Germanium).

The optical rotation sensor 100, 100', 100'' may be operated as follows:

Two conterpropagating beams are launched into the 1D PhC ring resonator 102 through one or two of the bus waveguides 104, 104' such that they resonate at the same wavelength when the optical rotation sensor is at rest. Differently, under rotation conditions, the counterpropagating beams resonate at different wavelengths. Assuming that $\Delta\lambda$ is a difference between a resonance wavelength of the optical rotation sensor at the rest (which is the same wavelength for both counterpropagating beams) and the resonance wavelength of the beam counterpropagating with respect to the rotation direction, the resonance wavelength difference between the two conterpropagating beams is equal to $2\Delta\lambda$.

The scale factor of the optical gyroscope is defined as the ratio of a change in the output (resonance wavelength change, $\Delta\lambda_\Omega$) to a change in the input to be measured (angular velocity change, $\Delta\Omega$):

$$SF = \frac{c}{\lambda_0^2} \frac{\Delta\lambda_\Omega}{\Omega} \tag{1}$$

wherein $\lambda_0$, $\Delta\lambda_\Omega$ and c are the operating wavelength, the Sagnac resonance wavelength difference due to the rotation, and the velocity in the vacuum, respectively.

Taking the scale factor SF into account, the spectral response can be evaluated by carrying out a frequency scan, i.e. sending light of varying frequency by the light source 200 towards the coupling region 110, and examining the corresponding output of the detector 202 which shows minima/maxima (resonance areas) at different frequencies of the light emitted by the light source 200. Out of these determined resonance areas, that one can be selected which is closest to an edge of the band gap. The spectral position of this "band edge resonance maximum/minimum" is determined when the optical rotation sensor is at rest (i.e. not rotated). When the optical rotation sensor is rotated, the Sagnac effect causes a red shift of the band edge resonance maximum/minimum when the 1D PhC is excited with a beam propagating in a direction opposite to the rotation direction (angular velocity); on the other hand, if the ring is excited with a beam propagating in the same direction as the angular velocity, the Sagnac effect is responsible of a blue shift of the band edge resonance maximum/minimum (resonance wavelength), having the same magnitude of the red shift. The signal processing unit 204 may be coupled to two outputs of the light detectors 202 which processes the output signals of the light detectors 202, in order to derive the angular velocity.

In the following description, theoretical background of embodiments of the present invention as well as further aspects of embodiments of the present invention will be explained.

The inventors recognized the possibility of applying a model based on the Coupled Mode Theory (CMT) to a rotation sensor 100, 100', 100'' as shown in FIGS. 1 to 4 including a 1D photonic crystal for analyzing their performance. The model, which will be described in the following, takes into account the effect of an absolute rotation of the ring resonator. The model allows studying the effect of an absolute rotation, independently of the specific technology employed. The model can be used for estimating the variation of the eigenvalues, photonic band gap and electromagnetic eigensolutions when the rotation sensor 100, 100', 100'' is rotating with respect to the corresponding characteristics in the stationary case.

The model determines the dispersion curve of the proposed device with specific attention to the photonic band gap and to eigenvalues and eigensolutions of the ring resonator of the rotation sensor 100, 100', 100'' when it does not rotate. The Sagnac effect caused by the rotation is taken into account by reformulating the CMT for the 1D PhC structure under an absolute rotation condition. The changes in PBG, eigenvalues and eigensolutions with respect to the stationary case are evaluated. Finally, by imposing the proper boundary conditions, including also the excitation of the closed loop 1D PhC structure through a straight bus waveguide, the spectral response of the rotation sensor 100, 100', 100'' under absolute rotation is determined.

The rotation sensor 100, 100', 100" shown in FIGS. 1 to 4 shows a spectral response expressed as $$\left|\frac{E_{out}}{E_{in}}\right|^2 = \left|\tau - \frac{1-\tau^2}{[1-\tau S_{11}(L)]} S_{11}(L)\right|^2 \quad (2) \quad (1)$$

wherein $E_{in}$ is the electric field of the light guided at the input section 106 of the bus waveguide 104 and wherein $E_{out}$ is the electric field of the light at the light output section 108, wherein $(1-\tau^2)$ being equal to the total power flowing, within the coupling area 110, from the bus waveguide 104 to the 1D PhC RR. $S_{11}$ (L) is given by:

$$S_{11}(L) = \frac{1}{2jKS_\Psi}((\Delta\beta_\Psi + jS_\Psi)Ke^{-S_\Psi L} - (\Delta\beta_\Psi - jS_\Psi)Ke^{S_\Psi L}) \quad (3)$$

wherein L=2πR (R is the ring radius) and $S_\psi$, K and $\Delta\beta_\psi$ are, respectively:

$$S_\Psi = \sqrt{|K|^2 - (\Delta\beta_\Psi)^2} \quad (4)$$

$$K = \frac{2\pi}{\lambda_{0,PBG}}(n_a - n_b) = \frac{2\pi}{\lambda_{0,PBG}}\Delta n \quad (5)$$

$$\Delta\beta_\Psi = \beta_s + \Psi_s - \frac{l\pi}{\Lambda} \quad (6)$$

with Δn being the index variation of PhC between first region 300 (a) and second region 302 (b), l the order of the 1D PhC, Λ the period (sum of lengths of one of the first regions 300 and one of the second regions 302) of the PhC, $\Lambda_{0,PBG}$ the PBG central wavelength, and $n_a$ and $n_b$ being the refractive indexes of first region 300 and second region 302. $\beta_s$ and $\psi_s$ are given by:

$$\beta_s = \frac{\omega n_b}{c}; \Psi_s = \frac{\omega n_b^2}{c}(1-\alpha_F)\Omega R \quad (7)$$

where αF is the Fresnel-Fizeau drag coefficient, Ω is the angular velocity of the system, c is the light velocity in vacuum, and ω is the angular frequency equal to 2πf, where f, the frequency, is equal to c/λ, with λ the wavelength thereof.

Figure 5:
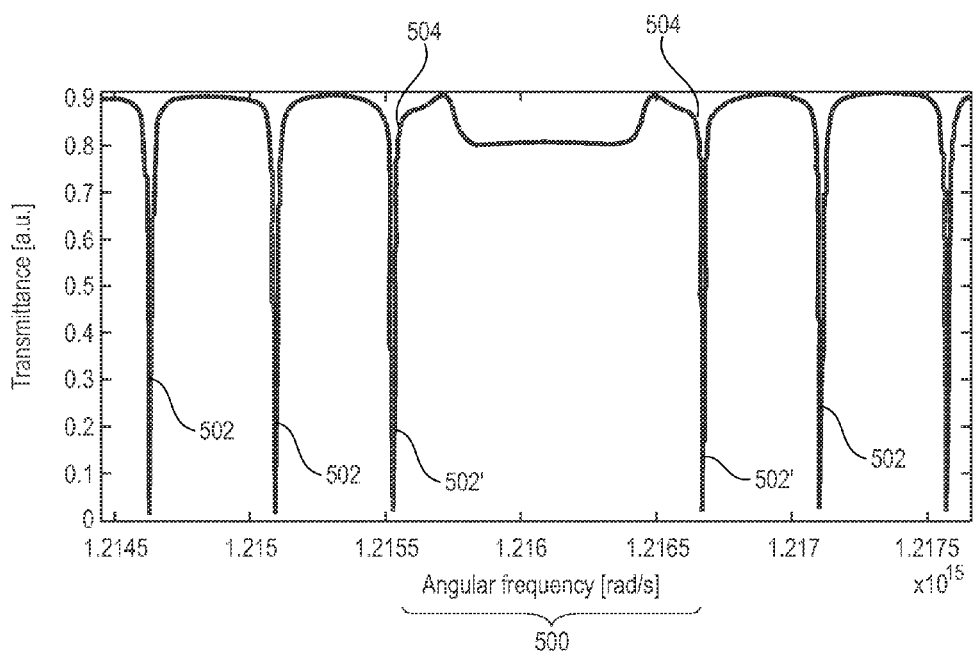
FIG. 5 shows an example of a spectral response of a ring resonator of an optical rotation sensor according to an embodiment of the present invention.

An example of the spectral response of the optical rotation sensor 100, 100', 100" derived from Equation (2) is shown in FIG. 5. It is assumed here that Λ=375 nm, L=1974.5 μm where L=4/|K| (K is given by Eq. (5)) for an index mismatch of Δn=0.001 and $\lambda_{0,PBG}$=1.55 μm. The spectral response refers to the 1D PhC ring for a power coupling coefficient (i.e. the total power flowing, within the coupling area 110, from the bus waveguide 104 to the 1D PhC RR) equal to 19%.

As can be derived from FIG. 5, no resonances 502 are present within the PBG 500, centered at $\omega_{0,PBG}$=1.2161× $10^{15}$ rad/s. In this example, the ring resonator 102 is excited through light guided by the bus waveguide 104 from the light input section 106 to the coupling area 110 by assuming a coupling efficiency of 19%. The resonances outside the PBG 500 become narrower at frequencies close to the edges 504 of the band PBG 500, where the group velocity tends to zero and the group index tends to infinity. Specifically, in this example, the resonance deeps close to the band gap edges 504 have a Full Width at Half Maximum (FWHM) of nearly ⅓ with respect to the resonances far from the PBG 500. The band gap resonances lines are denoted by 502'.

As in a conventional ring resonator, two operating conditions can be identified for the 1D PhC ring resonator: under-coupling condition and over-coupling-condition.

Figure 6A:
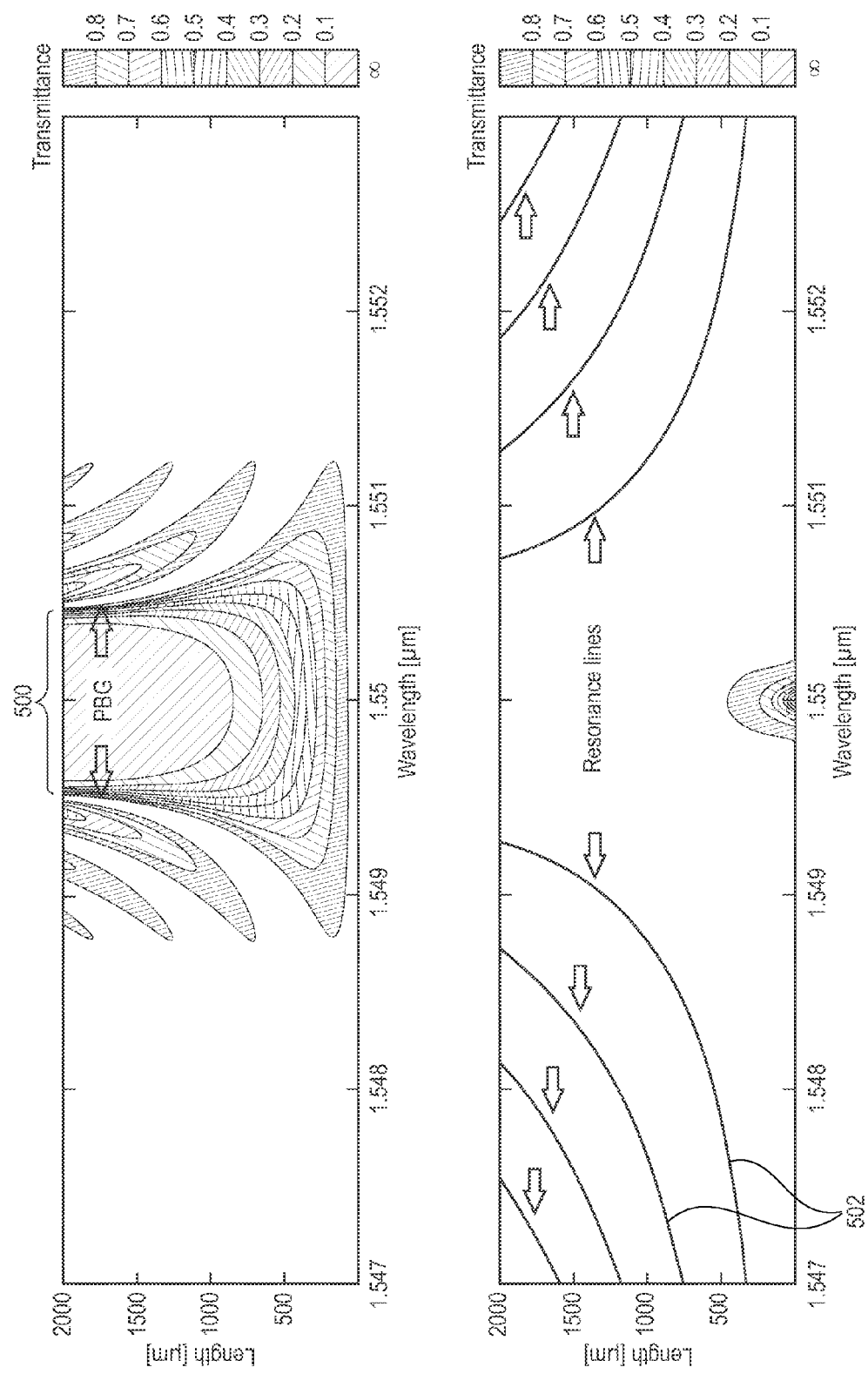
FIG. 6A shows locations of a photonic band gap as well as of resonant lines in case of a low coupling strength between the bus waveguide and the ring resonator of an optical rotation sensor according to an embodiment of the present invention.
Figure 6B:
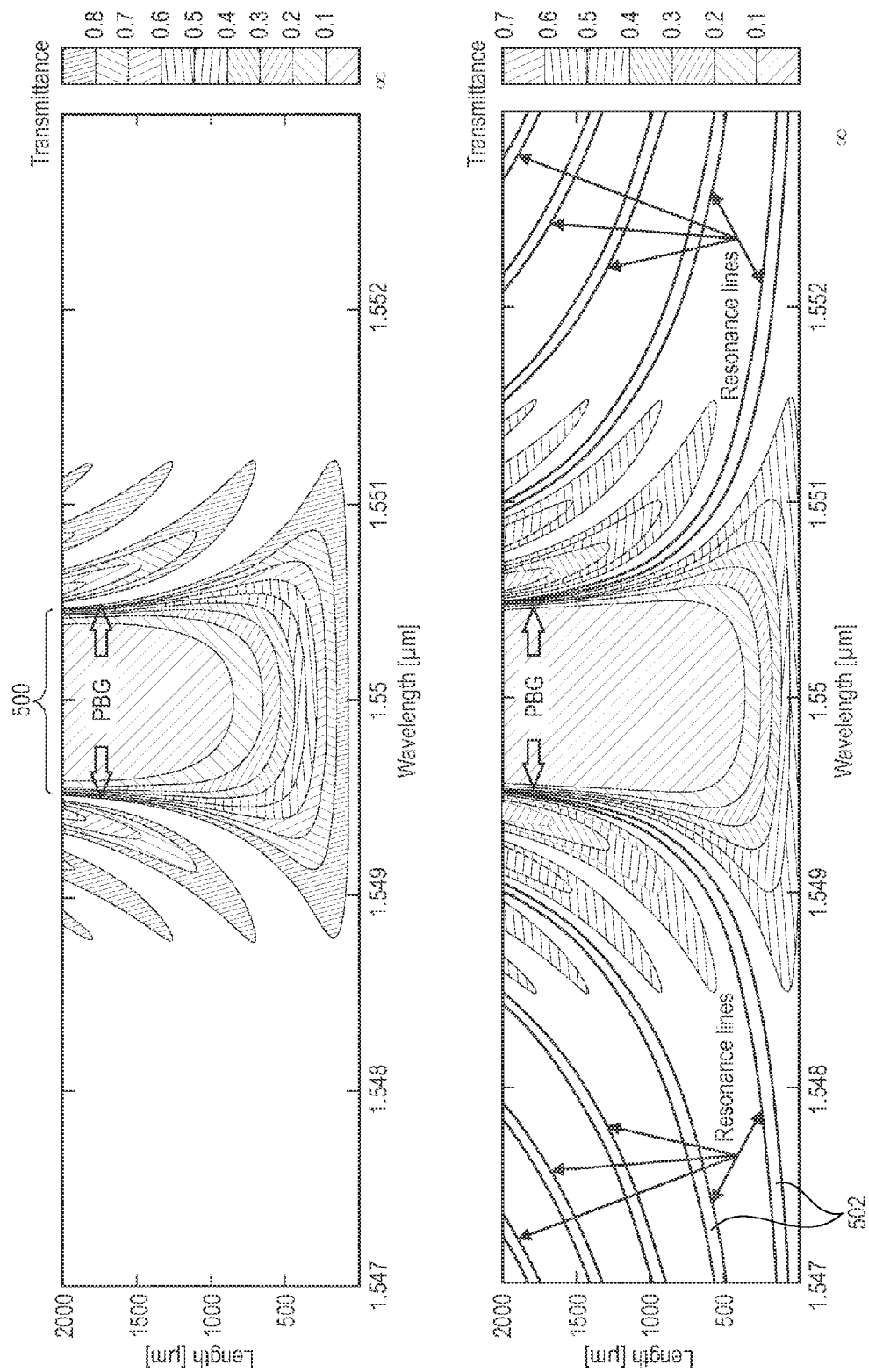
FIG. 6B shows locations of a photonic band gap as well as of resonant lines in case of a high coupling strength between the bus waveguide and the ring resonator of an optical rotation sensor according to an embodiment of the present invention.

In under-coupling condition (see FIG. 6a), the optical rotation sensor 100, 100', 100" shows very narrow resonance lines 502, based on alternating shallow maxima and deep minima, corresponding to the 1D PhC band edge oscillations. In over-coupling condition (see FIG. 6b), the system spectral response has a hybrid spectral behavior: the spectrum shows, at the same time, a PBG region 500, increased in its width with respect to a conventional 1D PhC, and wide resonance lines 502 at the PBG band edges 504.

We assume under-coupling condition and a long period 1D PhC ring resonator (L=2πR>900 μm) because long periodic structures are characterized by a very high reflectance (~99%) and very narrow band edge oscillations (the linewidth reduces when the number of periods (i.e. when the overall length of the ring resonator 102) increases). By assuming the under-coupling operating condition, two strategies can be considered for the gyro optimization:

A scale factor evaluation, which means a compromise between geometrical parameters and maximum phase shift imposed by the rotation;

A detection limit optimization, which involves geometrical parameters, scale factor, quality factor and resonance depth.

In the following, a possible realization of an optical rotation sensor 100" as shown in FIG. 4 is provided in accordance with an embodiment of the present invention, operated in under-coupling condition (i.e. power coupled from the bus waveguide 104 to the ring resonator 102 is around 2%) at $\lambda_{0,PBG}$=1.55 μm, with a ring resonator length, L=14400 μm (>900 μm), propagation losses of 0.07 dB/cm for the unperturbed waveguide having an effective index neff=1.457, is compared with a conventional ring resonator fabricated in silica on silicon technology. The 1D PhC ring resonator 102 in accordance with this embodiment is formed by alternating regions 300, 302 having a weak index variation (of the order of $10^{-3}$) in a SOS (silica on silicon) waveguide 104. The lattice constant has been assumed equal to 531.9 nm to get a first order grating (1D PhC) with a 1 nm wide band gap 500, centered at 1.55 μm. The parameters are summarized in FIG. 7.

For this optical rotation sensor, the band edge resonance lines 502' have been examined with the aim of finding conditions based on which the gyro performance is enhanced in terms of scale factor and detection limit (minimum detectable angular velocity).

It is found that, in under-coupling condition, the ring resonator 102 in accordance with the embodiment of the present invention shows very narrow resonance lines 502, based on alternating shallow maxima and deep minima, corresponding to the 1D PhC band edge oscillations (see FIG. 8(a) (1D PhC spectral response at band edge)). For comparison purposes, the curve 800 in FIG. 8(b) represents the transmittance of the conventional ring resonator having the same geometrical and physical parameters.

Figure 8:
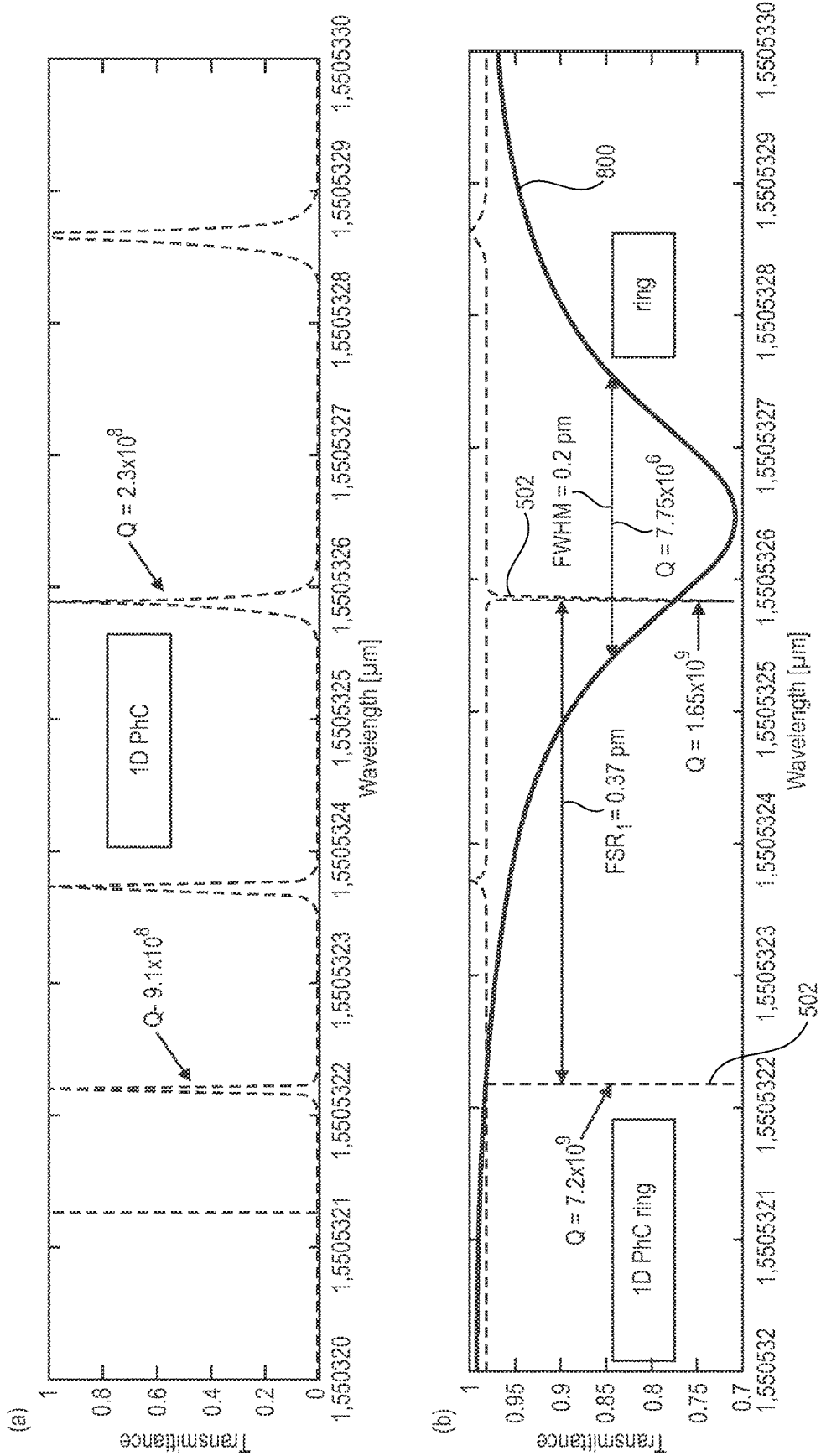
FIG. 8A shows a spectral response at a band edge of an optical rotation sensor according to an embodiment of the present invention.
FIG. 8B shows a spectral response of an optical rotation sensor according to an embodiment of the present invention, compared to a conventional ring resonator spectral response.

By considering the edge resonance closest to the band edge, the quality factor Q is enhanced up to Q=7.2×$10^9$, i.e. 3 order of magnitude greater than that of a conventional ring resonator (Q=7.65×$10^6$). Moreover, FIG. 8 shows that the quality factor Q is almost insensitive with regard to the variation of both coupling coefficient and propagation losses, resulting in a good tolerance to any variation in the fabrication conditions. Fabrication conditions tolerance is also demonstrated in terms of number of periods Λ in the grating structure. Simulation results have shown that the spectral characteristics of the 1D PhC ring resonator 102 are preserved even when the number of periods Λ in the 1D PhC (very high to ensure the condition L>900 μm) is not an integer number. The above mentioned characteristics represent a clear advantage compared to conventional ring resonators.

Figure 9A:
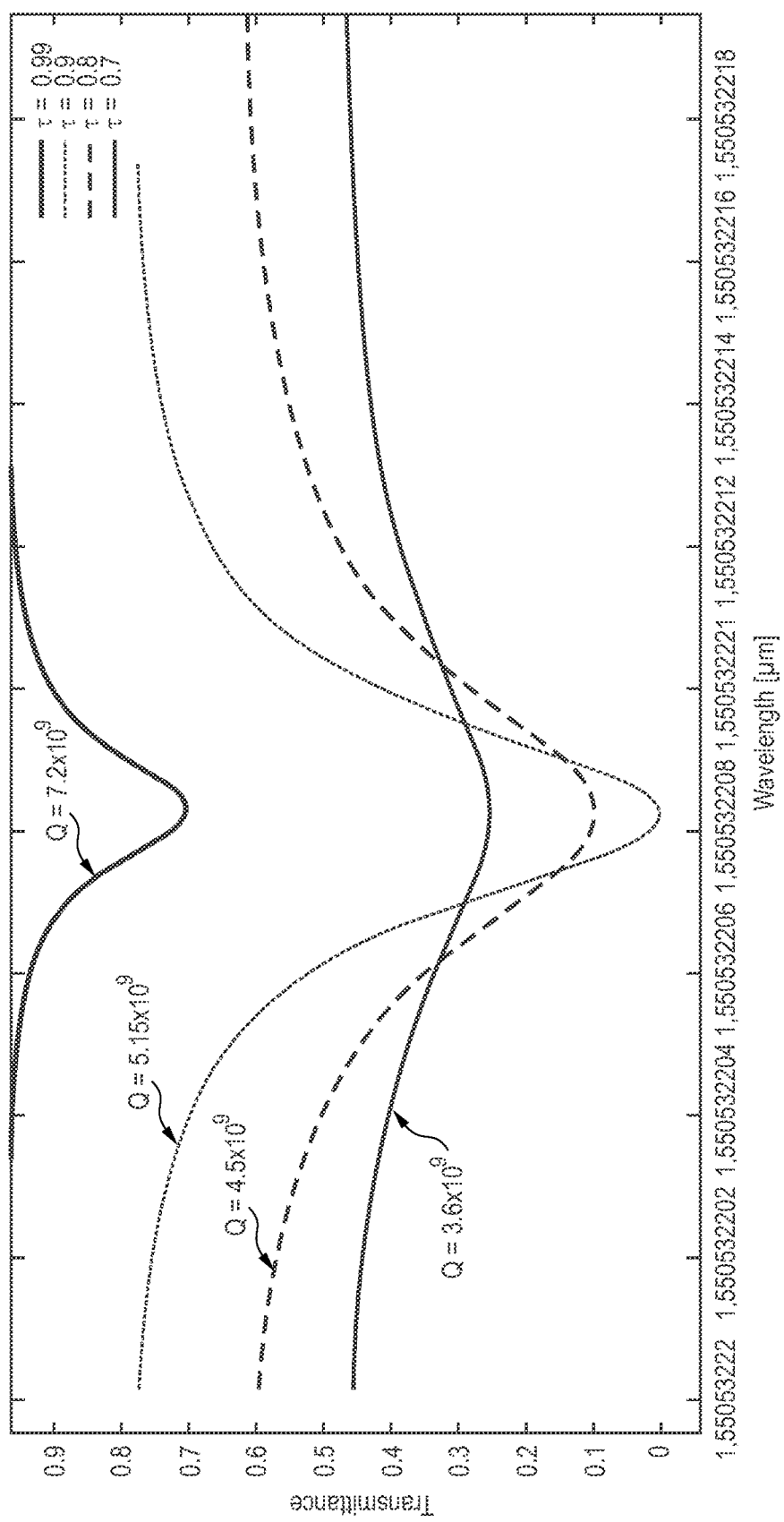
FIG. 9A shows a spectral response variation of a resonance area closest to a photonic band gap of an optical rotation sensor according to an embodiment of the present invention for different coupling coefficient values (i.e. different values of the power flowing from the bus waveguide to the 1D PhC ring resonator)
Figure 9B:
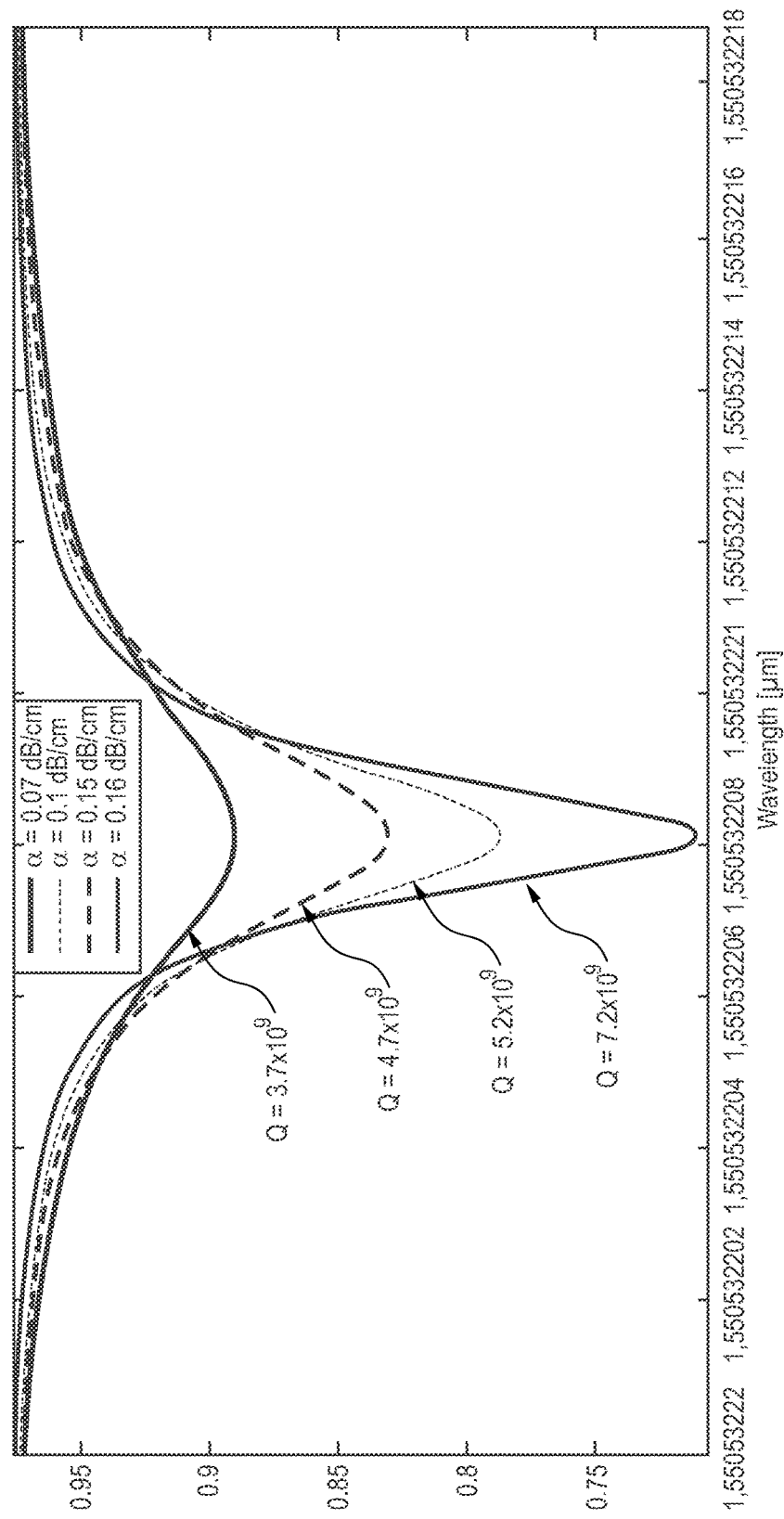
FIG. 9B shows a spectral response variation of a resonance area closest to a photonic band gap of an optical rotation sensor according to an embodiment of the present invention for different propagation loss values.

FIG. 9 shows a 1D PhC ring resonator spectral response variation at band edge 504 (resonance closest to the band gap 500): for different values of the coupling coefficient (see FIG. 9(a); for different values of the propagation losses (see FIG. 9(b)).

A gyro detection limit, δΩ, (i.e. minimum angular velocity detectable), can be evaluated by:

$$\delta\Omega = \frac{1}{SFQ\lambda_0^3}\sqrt{\frac{2Bhc^3}{\eta_{pd}P_{pd}}}\left(\frac{3600\times 180}{\pi}\right) [°/h] \quad (7)$$

It depends on all parameters defined and listed in FIG. 10 that are independent of the resonator characteristics, differently from quality factor, Q, and scale factor, SF.

The scale factor, SF, for a frequency-sensitive ring resonator gyro takes into account the amount of change in the sensor output resonance wavelength in response to a change of the angular rate. Q has been evaluated by considering the spectral response of the proposed device, while SF has been evaluated as the ratio between the resonance wavelength shift, due to the rotation of the optical rotation sensor, and the angular velocity Ω (see Eqn (1)). The SF is slightly reduced (about 0.7 times) with respect to that of a conventional ring resonator gyro having same geometrical and physical parameters.

The sensor detection limit δΩ is strongly improved (three orders of magnitude) with respect to a gyroscope based on a conventional ring resonator. FIG. 11 shows the values of detection limit as a function of the propagation loss for both a 1D PhC RR and a conventional RR having the same geometrical, physical and technological characteristics.

In order to fabricate the rotation sensor 100, 100', 100", a direct UV writing technique may be used that can create, in a planar silica-on-silicon (SOS) substrate, multiple planar geometry Bragg gratings, with lengths in the range of 1-10 mm, and waveguides having cross-sections with sizes comparable to that of fiber cores. This technique allows to easily achieve a weak index mismatch of the order of $10^{-3}$, between the first regions 300 and the second regions 302 of the grating of the ring resonator 102.

The direct UV writing technique may be applied to a compound of three sandwiched silica layers 402, 404, 406 on top of a silicon substrate 400, as shown in FIG. 4. It is assumed here that only the silica layer 402 is doped with Ge, whereas the top and bottom silica layers 406, 404 are doped with other elements such that the refractive index of all three layers are the same. Before the UV exposure, none of the layers 402, 404, 406 contains any guiding structure (waveguide 104, ring resonator 102).

The basic principles of UV-induced refractive index modification in Ge-doped silica are the same as those used to produce fiber Bragg gratings; the inclusion of Ge within the silica matrix causes defects that absorb light with a wavelength of 244 nm. This energy absorption generates a modification of the Ge defect that, in turn, induces an increase in the refractive index. By selectively exposing Ge-doped silica to intense 244 nm laser light, a refractive index in the exposed area higher than the surrounding unexposed or undoped regions is created.

This principle can be applied to the compound of three sandwiched silica layers 402, 404, 406 as shown in FIG. 4 as follows: Before the UV exposure of the silica layers 402, 404, 406, no waveguide structure does exist in the layer compound. If a UV laser beam is focused into the Ge-doped layer 402 and then translated in the plane of the layer, it is possible to directly write a waveguide in the doped layer 402 that has its width defined by the size of the laser spot and its depth determined by the thickness of the doped layer 402. If two overlapping laser spots are used instead of a single focused spot, then the resulting interference pattern can be used to write a Bragg grating by moving the laser during translation. That is, it is possible to use direct UV writing of the 1D PhC by using a single UV laser spot or two interfering UV laser spot).

The direct writing process therefore allows waveguides to be defined, with or without Bragg gratings, anywhere on the compound of three sandwiched silica layers 402, 404, 406, in a single step. It also enables additional complex optical waveguide structures (splitters, couplers and tapers) to be easily written.

What is claimed is:

1. An optical rotation sensor, comprising:
    a waveguiding ring resonator including a one-dimensional photonic crystal, 1D PhC,
    a bus waveguide, wherein a light input section of the bus waveguide is connectable to a light source, and a light output section of the bus waveguide is connectable to a light detector, and wherein the bus waveguide is optically coupled to the ring resonator within a coupling area which is located between the light input section and the light output section,
    wherein the optical rotation sensor is configured to measure a shift of the frequency of a resonance area close to a band edge of a photonic band gap of the ring resonator caused by a rotation of the optical rotation sensor, and
    wherein the resonance area is a minimum or maximum of transmittance of light guided from the light input section of the bus waveguide through the coupling area.

2. The optical rotation sensor according to claim 1, wherein the ring resonator comprises a concatenation of a plurality of first regions of a first refractive index and a plurality of second regions of a second refractive index which alternate with each other, wherein the first refractive index differs from the second refractive index.

3. The optical rotation sensor according to claim 2, wherein the difference between the first refractive index and the second refractive index ranges between $10^{-3}$ and $10^{-5}$.

4. The optical rotation sensor according to claim 3, wherein a sum of the lengths of one first region and one second region is chosen in dependence on the fulfillment of the Bragg conditions at a specified optical sensor operating wavelength.

5. The optical rotation sensor according to claim 4, wherein a ratio between power of the electric field of light guided from the light input section of the bus waveguide to the coupling area, and power of the electric field coupled from the bus waveguide into the ring resonator within the coupling area ranges between 0.01 and 0.1.

6. The optical rotation sensor according to claim 5,
wherein the optical rotation sensor is configured to measure a shift of frequency of a resonance area closest to a band edge of a photonic band gap of the ring resonator caused by a rotation of the optical rotation sensor.

7. The optical rotation sensor according to claim 1, comprising:
a silicon layer, a first silica layer provided above the silicon layer, a doped silica layer provided above the first silica layer, and a second silica layer provided above the doped silica layer,
wherein the ring resonator and the bus waveguide are formed within the doped silica layer.

8. The optical rotation sensor according to claim 7, wherein the doped silica layer comprises germanium.

9. The optical rotation sensor according to claim 8, further comprising a light source coupled to the light input section of the bus waveguide, and a detector coupled to the light output section of the bus waveguide.

10. An angular velocity sensor, comprising the optical rotation sensor according to claim 9.

11. An optical switch, comprising the optical rotation sensor according to claim 9, wherein the switch is adapted to switch from a first state to a second state when the shift of frequency of a resonance area close to a band edge of a photonic band gap of the ring resonator caused by a rotation of the optical rotation sensor exceeds a predetermined threshold value.

12. A method of manufacturing an optical rotation sensor, comprising:
forming a ring resonator as a one-dimensional photonic crystal, 1D PhC, waveguide, in a doped silica layer provided above a silica layer deposited on a silicon layer,
forming a bus waveguide in the doped silica layer such that a light input section of the bus waveguide is connectable to a light source, and a light output section of the bus waveguide is connectable to a light detector, and the bus waveguide is optically coupled to the ring resonator within a coupling area which is located between the light input section and the light output section,
wherein the formation of the ring resonator and the bus waveguide is carried out such that the optical rotation sensor is capable of measuring a shift of frequency of a resonance area at or close to a band edge of a photonic band gap of the ring resonator caused by a rotation of the optical rotation sensor, wherein the resonance area is a minimum or maximum of transmittance of light guided from the light input section of the bus waveguide through the coupling area.

13. The method according to claim 12,
wherein the formation of the ring resonator and the bus waveguide is carried out by exposing the doped silica layer to ultraviolet light radiation.

14. The method according to claim 13,
wherein the ring resonator is formed by irradiating a plurality of first regions of the doped silica layer with a first irradiation dose, and by irradiating a plurality of second regions of the doped silica layer with a second irradiation dose, wherein a concentration of thus irradiated first regions and second regions forms the ring resonator.

15. The method according to claim 14,
wherein the bus waveguide is formed by irradiating a corresponding part of the doped silica layer with the second irradiation dose.

* * * * *